United States Patent
Kabadiyski (10) Patent No.: US 8,296,758 B2
(45) Date of Patent: Oct. 23, 2012

(54) DEPLOYMENT AND VERSIONING OF APPLICATIONS

(75) Inventor: Mario Kabadiyski, Walldorf (DE)

(73) Assignee: SAP AG, Walldorf (DE)

( * ) Notice: Subject to any disclaimer, the term of this patent is extended or adjusted under 35 U.S.C. 154(b) by 1292 days.

(21) Appl. No.: 11/858,620

(22) Filed: Sep. 20, 2007

(65) Prior Publication Data

US 2008/0072219 A1 Mar. 20, 2008

Related U.S. Application Data

(60) Provisional application No. 60/846,155, filed on Sep. 20, 2006.

(51) Int. Cl.
G06F 9/44 (2006.01)
G06F 9/445 (2006.01)
(52) U.S. Cl. ........................ 717/174; 717/168
(58) Field of Classification Search ........... 717/174–175
See application file for complete search history.

(56) References Cited

U.S. PATENT DOCUMENTS

| | | | |
|---|---|---|---|
| 6,209,128 B1 * | 3/2001 | Gerard et al. | 717/170 |
| 6,377,960 B1 * | 4/2002 | Qiu et al. | 717/174 |
| 6,745,385 B1 * | 6/2004 | Lupu et al. | 717/163 |
| 6,928,637 B2 * | 8/2005 | Leherbauer | 717/122 |
| 7,124,408 B1 * | 10/2006 | Parthasarathy et al. | 717/170 |
| 7,665,080 B2 * | 2/2010 | Spotwood | 717/166 |
| 7,774,762 B2 * | 8/2010 | Rochette et al. | 717/138 |
| 2003/0009754 A1 * | 1/2003 | Rowley et al. | 717/177 |
| 2004/0177352 A1 * | 9/2004 | Narayanaswamy et al. | 717/169 |
| 2005/0131870 A1 * | 6/2005 | Krishnaswamy et al. | 707/3 |
| 2008/0071844 A1 * | 3/2008 | Gopal et al. | 707/204 |

* cited by examiner

*Primary Examiner* — Li B Zhen
*Assistant Examiner* — Ryan Coyer
(74) *Attorney, Agent, or Firm* — Blakely, Sokoloff, Taylor & Zafman (57) ABSTRACT

A method and system to deploy a software archive on a runtime environment. The method extracts metadata from the archive and verifies the components can be deployed and further deploys them on the runtime environment.

12 Claims, 8 Drawing Sheets

DEPLOYMENT AND VERSIONING OF APPLICATIONS

CROSS-REFERENCE TO RELATED APPLICATIONS

This application claims the priority of U.S. Provisional Patent Application Ser. No. 60/846,155, filed Sep. 20, 2006.

BACKGROUND

1. Field of Invention

The invention relates generally to software environments, and, more specifically, to deploying software components.

2. Background

Software environments require that software components such as business applications, upgrades, configurations, and so on must be deployed before they are run on an environment. When an application is deployed on a system, it is referred to as a deployed component. Deployed components include one or more modules that contain source code and application resources. The smallest deployable unit of an application is an application module. Application modules are packed for distribution into application archives. If a modification is made to any part of a module, the whole module must be redeployed. The latter single module approach is suitable for application development and testing. In a large software environment, modifications to a system cannot be applied module by module because of time and resource constraints. For example, once a module is applied to a system, the system cannot provide any information about current version and compatibility state of an affected application. This in turn makes the analysis of runtime problems due to incompatibility issues substantially more difficult.

In another aspect, application modules often use interfaces or parts of other modules or libraries. To run properly, such modules need all dependent parts to be deployed and active. These dependencies have to be declared by the application and processed by the deployment services. Application modules also depend on the runtime environment because they use its services and communication interfaces. This results in the platform release dependence. Such dependencies must also be declared by the application and processed by the deployment service.

In the context of Java applications, the application resources of a Java application are packaged into one Software Component Archive (hereinafter "SCA"). An SCA contains two types of deployable objects. These are module and configuration archives. Module archives contain the java code of the application and all runtime resources. The configuration archives contain data for configuration management. Modules and configurations are both application resources. However, configurations have specifics that require separate treatment. Modules and configurations are packed in Java archive files (hereinafter "JAR") in the software component level of the SCA and specify deployment descriptors as main attributes in a corresponding MANIFEST.MF file in the JAR. The MANIFEST.MF file is a file that contains metadata for the SCA.

SUMMARY

A method and system to deploy software components on a runtime environment is described. The method extracts metadata to a memory that is independent of a file system and verifies if the components can be deployed based on the metadata. The method further deploys the components after the verification is complete.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Software environments such as application servers are initially installed and configured with a set of components. For the components to run on an environment, they must be deployed on a system. Deployment involves obtaining components, checking if they can be deployed on the environment and if the checks are satisfied, physically uploading the components to the runtime environment. To start a deployment process, an embodiment of the invention receives input with deployment parameters via a user interface. The deployment parameters contain a path to a software archive containing components for deployment and configuration parameters pertaining to the deployment process.

Figure 3:
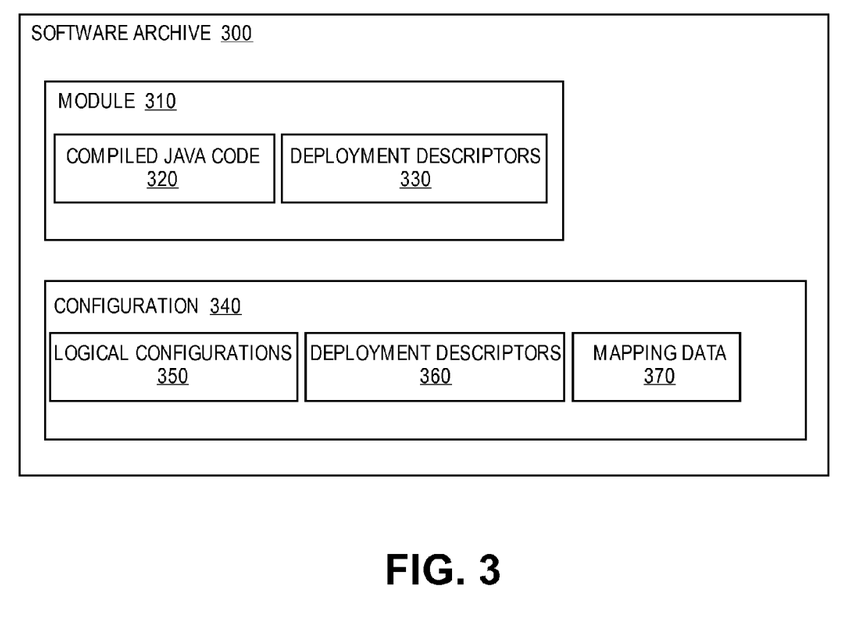
FIG. 3 is a block diagram of a software archive.

As shown in FIG. 3, a software archive 300 contains modules 310 and configurations 340. Modules 310 are application source code. As such a module 310 contains compiled code 320 and deployment descriptors 330. Configurations contain configuration information in the form of logical configurations 350, deployment descriptors 360, and mapping data 370.

Figure 1:
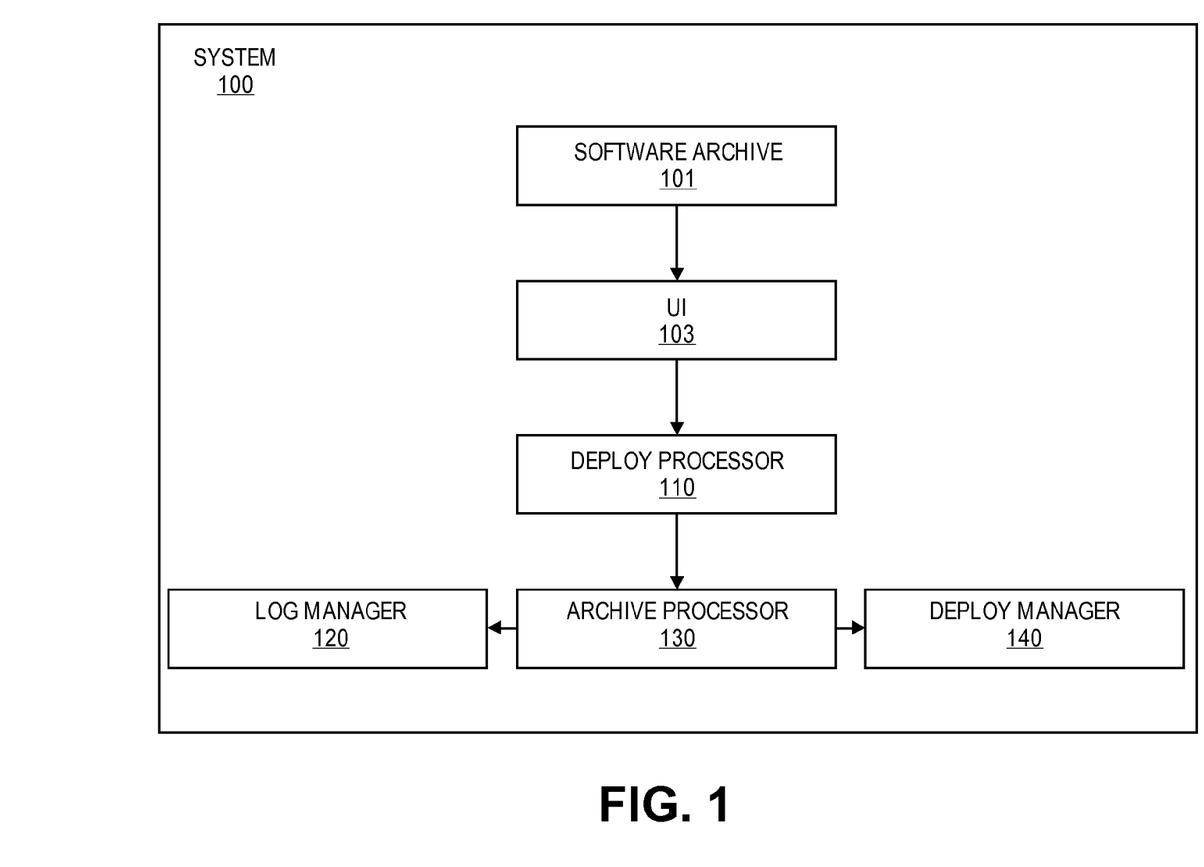
FIG. 1 is a block diagram of a system of one embodiment of the invention performing the process of FIG. 2.
Figure 2:
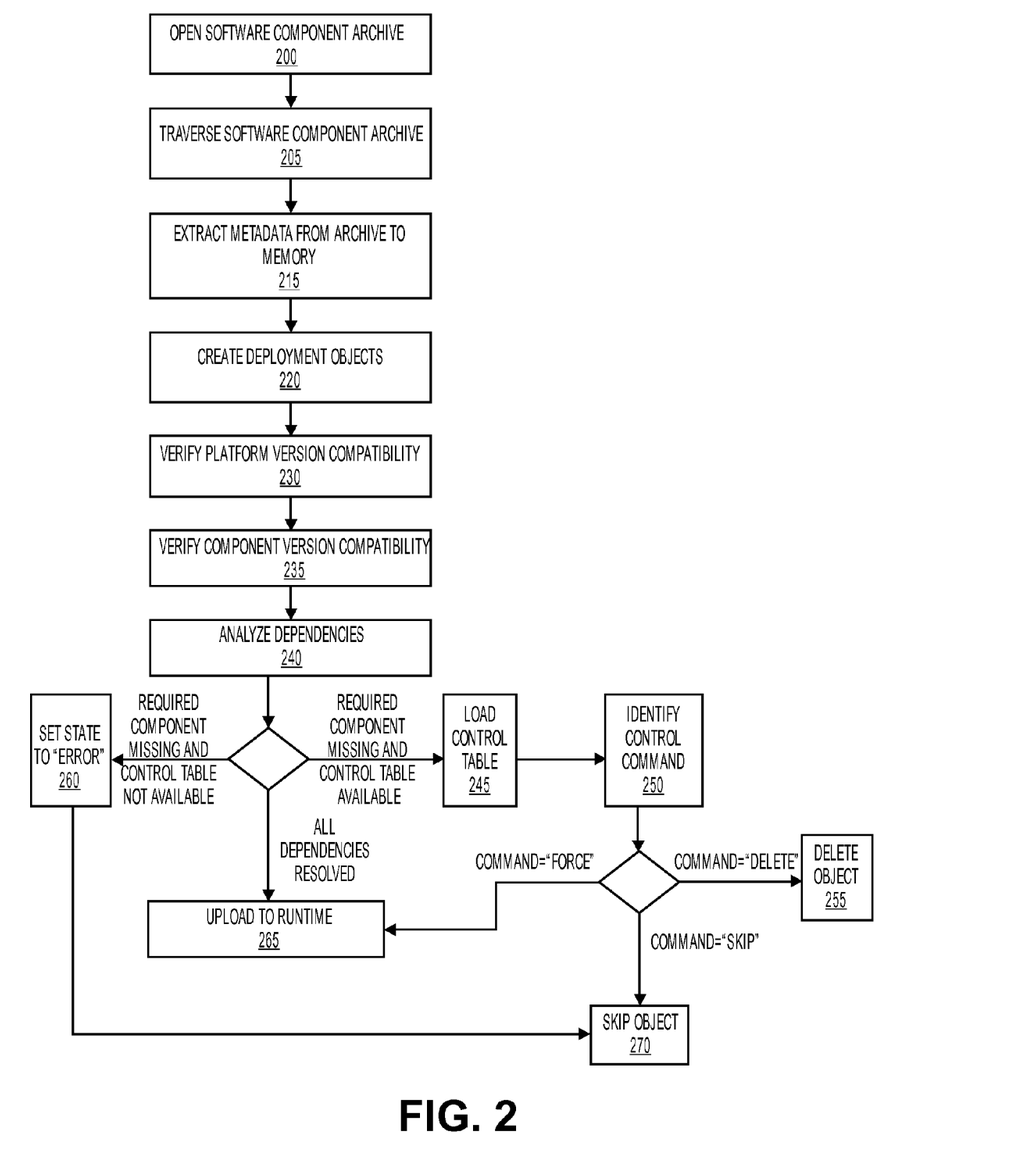
FIG. 2 is a flow chart of a deployment process executed by an embodiment of the invention.

Referring to FIG. 1, the deploy processor 110 receives a software archive 101 through the user interface (UI) 103. The deploy processor 110 sends the archive to the archive processor 130. Referring to FIG. 2, the archive processor 130 opens the software archive 200 and traverses it 205. During the traversing 205, the archive processor 130 extracts all metadata from the archive and stores it to memory 215. In one embodiment, the memory is main memory and is independent of a file system. By extracting to a memory, and extracting only metadata, a number of important benefits are achieved. For example, by not extracting all data from the archive on a file system, the system 100 reduces the possibility of errors to a substantial extent because extracting all contents of an archive to a file system is very error-prone. Also, because only a small portion of the data in the archive is extracted, the deployment process is less time consuming and more efficient. Later in the process, keeping the metadata in main memory allows for random access to different portions of the stored metadata as is required for deployment.

Based on the extracted metadata, the archive processor 130 creates deployment objects 220. To deploy the deployable objects, the archive processor 130 checks the compatibility of the objects to the runtime environment platform version, to the version of the objects already deployed on the environment, and the dependencies between objects. The relevant information for these checks is included in the deployment descriptors of components. The archive processor 130 retrieves the platform version of the runtime environment and the platform version of the deployable objects and verifies their compatibility 230. Then the archive processor 130 retrieves the component versions of the components deployed on the runtime environment which are required by the deployable objects, the components versions of deployable objects, and verifies their compatibility 235. With the latter two checks the archive processor 130 ensures that from a versioning perspective, the deployable objects can safely run on the environment.

After the versioning checks, the archive processor 130 checks dependencies between components 240. In this section of the process, each deployable object is analyzed for dependencies to other components. That is, does the object need any other components to run on the environment? If no dependencies are identified, the deployment manager 140 deploys the objects on the environment 265. When objects are deployed, they are encapsulated and activated on the environment. Encapsulating an object means wrapping the object so that it can run on the environment even if the environment contains components incompatible with it. This mitigates the risk of conflicts where concurrently existing transactions use different versions of the same objects. In such cases, older versions are maintained on the environment until the transactions relying on are complete. In one embodiment, once all transactions relying on an older version of the objects complete, those objects are deleted from the environment. After deployment of the object any newly initiated transaction will use the newest version deployed.

In complex environments, objects may depend on more than one component. If each of these components is available, the deployment manager 140 deploys the objects 265. If a component is not available, and there are no further instructions for its processing, the archive processor 130 sets its state to "error" 260 and skips the object 270. The system 100 also allows for special instructions to be supplied and executed in the event of an object dependency being unresolvable. If the object has dependencies and further instructions are supplied in a control table, the control table is loaded from storage 245. The control table contains specific commands instructing the archive processor 130 how to proceed with the object. The command is identified 250 and applied. If the command is to delete an object if its dependencies are not resolved, the archive processor deletes the object 255. If the command is to skip the object if its dependencies are not resolved, the archive processor skips the object 270. However, in some cases deployment of an object may be required notwithstanding that the object's dependencies cannot be resolved. In this case, a force command is supplied, and the archive processor 130 sends the object to the deployment manager 140 for deployment on the runtime 265. The latter case allows for a software environment to be downgraded. Without a forced deployment, a deployment system performing only static checks would not provide the possibility of a downgrade. Downgrades are important in certain test and maintenance scenarios, such as ensuring backward compatibility of systems.

Throughout the deployment process, the log manager 120 maintains data about the process and logs errors and warnings about the process. After the deployment completes, the log manager 120 sends the log to the deploy processor 110. The deploy processor in turn sends the log to the UI 103 and the UI reports the log. Thus, an error handling policy can be applied through an analysis of the log.

In an embodiment of the invention, Java application components are packed into a software component archive (hereinafter "SCA"). SCA upload is performed in two stages. Firstly, the SCA is uploaded to one of the application servers and is traversed to find out, which and how many deployable Java objects (modules or application configurations) it contains. The deployment descriptors for these objects get cached and preliminary version checks take place. In the second stage, approved objects are physically uploaded to a runtime environment. After the completion of the deployment process, a list of all processed objects and a detail log about all errors and warnings occurred during deployment may be supplied.

An SCA is a nested archive forming a tree of four layers. Java resource files are divided in different components on the second level of the SCA tree. Physically deployable objects are packed into Java archives (hereinafter "JAR") within a corresponding archive on the third level of the SCA tree. The root level of each JAR contains a META-INF directory with the JAR MANIFEST.MF file. The SCA deployment service looks for the deployment descriptors either in this MANIFEST.MF or if not found there in a file in the root level of the JAR called deployment.properties. Deployment descriptors contain all necessary information to upload and activate the contained application resources. The deployment descriptors also tell the deployment service what kind of resources it has to process—configurations or modules. The deployment expects to find only one module in a module-type JAR and in general more than one logical configuration in a configuration-type JAR. All logical configurations in a JAR belong to the same application. Configuration-type JARs contain an obligatory mapping resource which defines the mapping between the resource data (eXtensible Markup Language, hereinafter "XML" files) and the corresponding logical configuration.

In the embodiment of the invention, the deployment system is implemented using three layers, an UI layer 460, an Advanced Business Application Programming (hereinafter "ABAP") layer 435, and a Java layer 400, as shown on FIG. 4. For an application to be deployed, the archive is uploaded to an application server instance and the analyzed to identify deployable Java objects, that is, modules and configurations. This is referred to as "parsing mode". In parsing mode, an SCA Processor 410 opens the software component archive, traverses it to find deployable Java resources and reads in their deployment descriptors. For each found module or configuration archive it creates one or more deployable objects and stores them. In this mode, the system stores the transformed deployment attributes in a form which is suitable for physical processing and implements various attribute format transformations and platform related version checks. Also, type specific deployment attributes for modules and configurations are maintained separately.

Once the objects are identified, their deployment descriptors are read and version checks are performed on them. Once the deployable objects are approved, they are loaded into the application runtime. To confirm the completion of the process, the system provides a list of deployed objects and a list of errors and warnings that occurred during the deployment process. The deploy system also implements error handling policies and object-level processing instructions for specific modules and configurations. This is referred to as "deployment mode". In deployment mode, the platform and mutual dependencies of all objects in the list are processed and uploaded to the application runtime. The physical upload is performed by a built-in database class loading connector.

Figure 4:
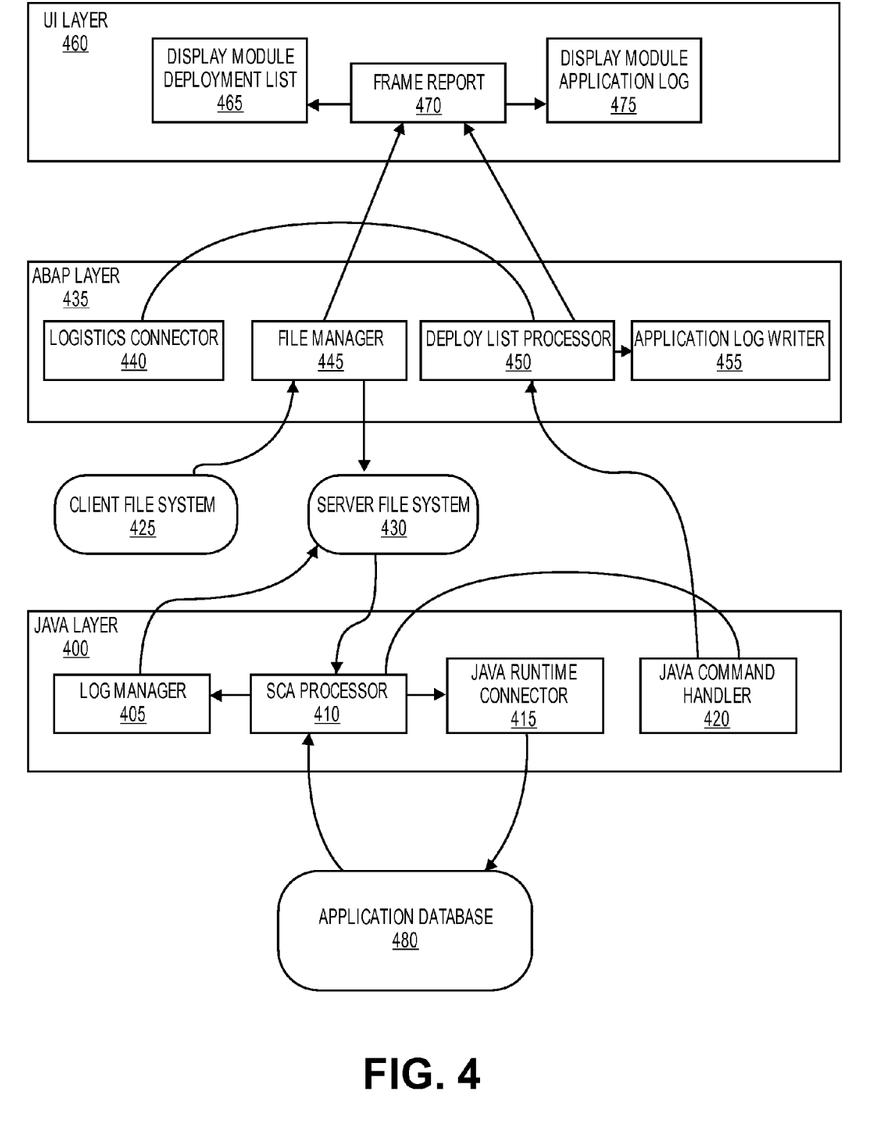
FIG. 4 is a block diagram of an exemplary system on one embodiment of the invention performing the process of FIG. 2.

Referring to FIG. 4, deployment parameters and an archive location are collected at the UI layer 460. The collected input is then received at the ABAP layer 435 which uses the Java command handler 420 to communicate with the Java layer 400. The Java layer 400 processes the archive and uploads deployable objects on the Java application runtime using the Java runtime connector 415. Once the process is completed, the Java layer 400 uses the Java command handler 420 to send a list of performed operations to the deploy list processor 450. The deploy list processor 450 in turn sends two reports to the UI layer 460 to display and confirm the deployment process.

The processor types in the Java layer are shown separately in FIG. 4. The Java command handler 420 instantiates exactly one SCA Processor 410 per SCA and controls its life cycle. It also creates an instance of the Log Manager 405 to log its own processing messages. The SCA Processor 410 uses one or more instances of a specialized input stream object to enable the read of application resources without unpacking them to a persistent storage. The specialized input stream object extends a regular Java input stream object with valuable features like random reading of particular resources. This is necessary because the underlying regular Java input stream is a low level inflator stream which can only access the archive data in sequential order. It can not be reset or repositioned and is the only possible stream to access nested JAR type entries in a compressed archive. On the other side, deployment data processing must be able to access particular resource data in random order because it analyzes dependencies between them and determines the right deployment order. The specialized input stream object can be instructed to cache the data bytes of particular resource types at the moment the underlying regular input stream reaches them. Thus, they can be accessed at an arbitrary point in time and access is not bound to the store sequence in the archive.

Error handling in the Java layer 400 is enabled by several exception types that keep error codes and information for error situations. When a deployment exception type is instantiated, the corresponding error code is set and the actual message parameters are saved for later use. The Log Manager 405 can then retrieve all the information at log time. This approach allows very detailed error logging with the possibility to trace back not only the technical but also the logical cause of a deployment processing error.

Figure 5:
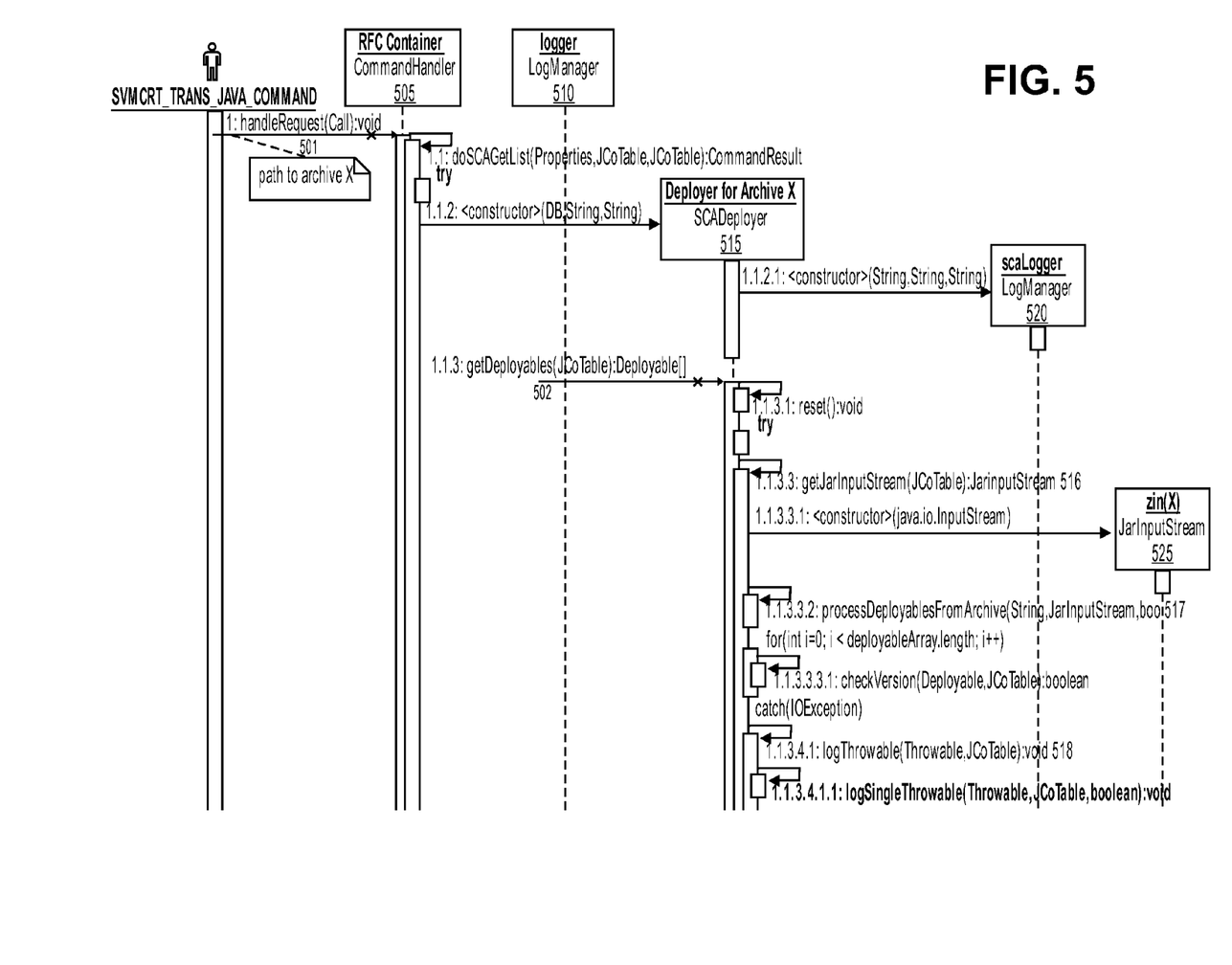
FIG. 5 is a shows list extraction from a software archive performed by an embodiment of the invention.

As noted above, SCA processing is performed in two stages. First, a list of deployable objects is extracted. Referring to FIG. 5, list extraction is initiated by a Remote Function Call (hereinafter "RFC") 501. The command handler 505 in turn instantiates a new SCA Deployer instance 515, associates it with the SCA and calls the method getDeployables 502 on it. From this point the control is taken over by the SCA Deployer 515. It opens an input stream 516 and starts processing the deployables from the archive 517 to traverse the nested levels of the archive tree and look for deployable objects. The method processDeployables 517 performs both list extraction and actual deployment and is instructed which stage to perform via a Boolean parameter. After the list is extracted, the SCA Deployer 515 does all necessary version checks to ensure that the modules and configurations in the list are basically deployable. Versions are checked from two perspectives: own version compatibility and platform version dependency. The deployment descriptors specify some versioning attributes for both perspectives. In general, the versioning attributes contain at least one implementation version string of type digit+{.digit+}* (e.g. 700.11.20051011.12345). The deployment service looks for the corresponding object in the persistence database and compares their versioning strings with the specified string. From the own version compatibility perspective the specified version must be greater or equal to the version of the deployed object (module or configuration). To calculate this relation, the corresponding version strings are translated into long arrays by splitting into numbers along the separator dots. The resulting arrays are then compared "from left to the right".

From the platform dependency version perspective, the version parameters of the corresponding platform component are compared with the specified version parameters in the deployment descriptor. Platform version parameters contain at least one major release and one patch number. Major release numbers for specified and deployed components must be equal. The patch version for installed platform components must be greater or equal to the specified patch version. The result of the version checks is reflected in the state field of each deployable instance. If the implementation version and the other relevant deployment attributes are compatible with the installation, the object is set to state new, otherwise it is set to state error.

FIG. 5 shows also some error handling essentials. During the all SCA processing, exceptions are logged via the Java Logging Application Programming Interface (hereinafter "API") and in an application log on the ABAP layer. The latter is used to show a request related error list in the UI after all deployment stages are executed. Special care is taken to use one and the same information for both logs. This information is taken directly from the deployment exceptions. To allow better error cause analysis, the nested exceptions are also separately logged. In one embodiment, localized messages use the method SCADeployer.logThrowable( ) 518.

In the second deployment stage, all found modules and configurations in the archive are analyzed for dependencies to other objects. At this point, a special deployment control table can be used to specify mandatory operations for particular modules or configurations in the list. The following control commands can be specified: "force", "skip", and "delete". The command "force" instructs the deploy processor to ignore the result from any dependency checks and to upload the object resources directly. For example, this is the only way to achieve a downgrade of a Java module. The command "skip" instructs the deploy processor to skip the corresponding deployable from upload. The command "delete" instructs the deploy processor to delete the corresponding deployable from the application runtime.

Figure 6:
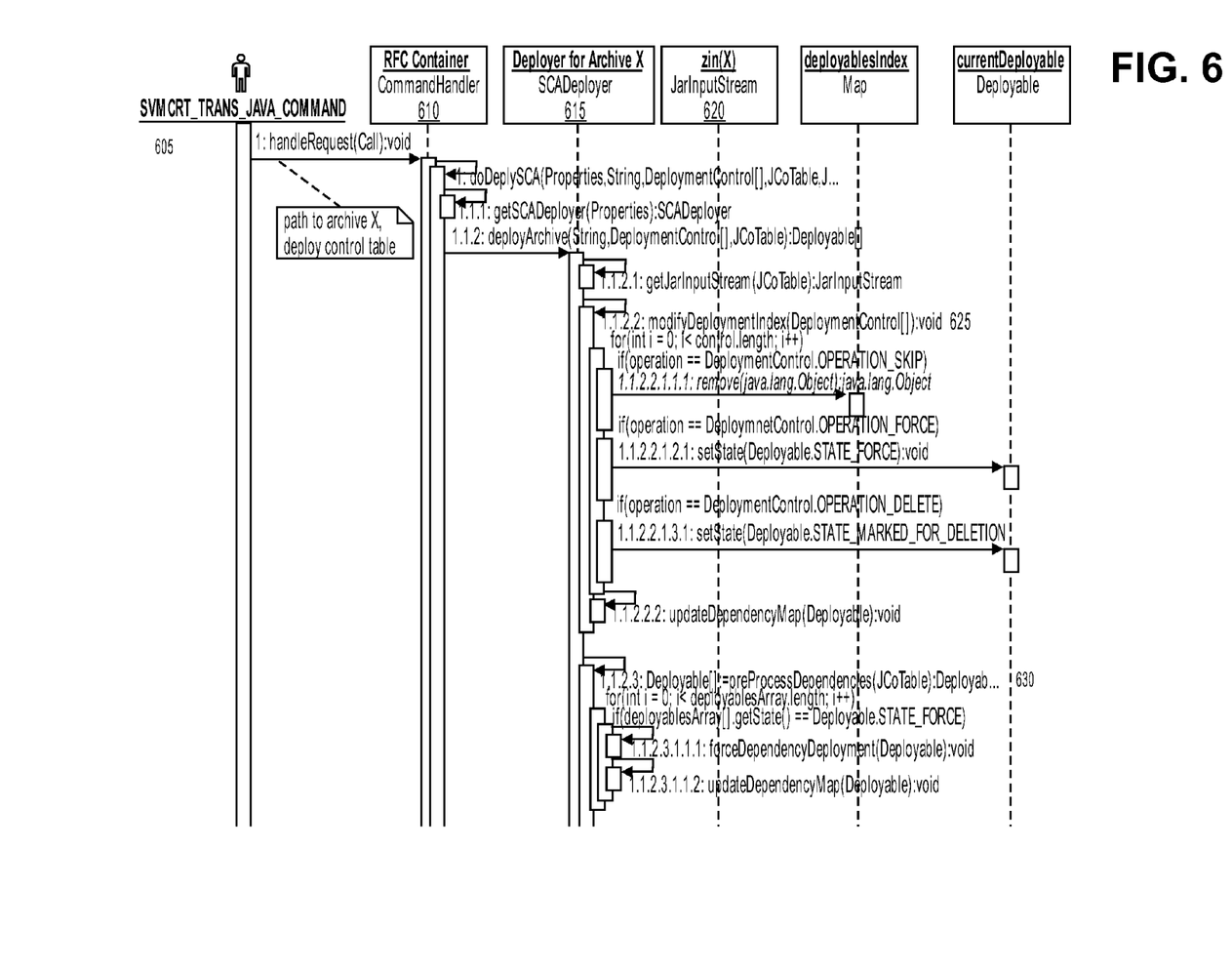
FIG. 6 shows dependency checking and deployment of a software archive performed by an embodiment of the invention.

When dependencies are examined, if some required objects (modules) are neither installed nor available for upload in the same archive, the corresponding deployable object is set to state error and skipped from further processing. FIG. 6 shows an example embodiment of the overall deployment sequence. The process is initiated by the function module SVMCRT_TRANS_JAVA_COMMAND 605 which again sends to the CommandHandler 610 the local path to the archive and an optional control table. The execution control is then transferred to the corresponding SCA Deployer 615 which instantiates the initial input stream 620 for the archive. After parsing the control table (SCADeployer.modifyDeploymentIndex ( ) 625) the SCA Deployer 615 analyzes the object dependencies (using the method preprocessDependenices( ) 630) and triggers the deployment via method processDeployablesFromArchive( ) 635.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
accessing application resources residing on a software archive;
caching metadata of the application resources from the software archive into memory that is independent of a file system of a runtime environment;
identifying a set of objects to be deployed from the application resources residing on the software archive based on the cached metadata, including identifying the set of objects based on deployment descriptors contained in the cached metadata;
verifying deployability of objects in the identified set of objects to the file system of the runtime environment, wherein verifying deployability includes:
retrieving component version information for an object in the identified set of objects from the cached metadata,
retrieving component version information for a previously deployed object in the runtime environment, the object corresponding to the previously deployed object, and
determining whether the object is a different version of the previously deployed object based on the retrieved component version information for the respective objects;
encapsulating objects in the identified set of objects that are incompatible with other objects deployed to the file system of the runtime environment, including encapsulating objects that are different versions of the previously deployed objects, wherein encapsulating objects is wrapping objects to run on the runtime environment even in the presence of the other objects with which the encapsulated objects are incompatible;
deploying the identified set of objects to the file system of the runtime environment, including any encapsulated objects;
maintaining in the file system of the runtime environment the other objects with which the encapsulated objects are incompatible, including
maintaining previously deployed objects, until existing transactions depending upon the other objects are complete.

2. The method of claim 1, wherein caching metadata of the application resources from the software archive into memory comprises:
traversing the software archive;
reading metadata from the deployment descriptors for the application resources accessed in the software archive; and
storing the metadata in the memory that is independent of the file system of the runtime environment.

3. The method of claim 1, wherein verifying deployability further includes:
retrieving platform version information from the cached metadata;
retrieving platform version information for the runtime environment;
comparing whether the retrieved platform version information from the cached metadata is compatible or incompatible with the platform version information for the runtime environment; and
setting a state of the set of objects to an error state if the retrieved platform version information is incompatible.

4. The method of claim 3, wherein verifying deployability further includes:
identifying any objects upon which the objects in the set of objects depends;
determining availability of the identified objects;
for each object in the set of objects that depend upon identified objects that are not available, performing one of deleting the object from the set of objects, skipping the object during deploying the set of objects to the file system of the runtime environment, and forcing the object to deploy to the file system of the runtime environment, wherein performing is based on a specified mandatory operation for the object in the set of objects if an object dependency is not satisfied; and
stopping deploying the set of objects if an object dependency of the object in the set of objects is not satisfied and no specified mandatory operation exists for the object.

5. The method of claim 1, further comprising:
logging information during deploying the set of objects;
displaying a list of deployed objects after deployment has completed; and
displaying a list of errors and warnings that occurred during deployment.

6. An article of manufacture comprising a non-transitory machine readable medium having instructions therein that when executed cause the machine to:
access application resources residing on a software archive;
cache metadata of the application resources from the software archive into memory that is independent of a file system of a runtime environment;
identify a set of objects to be deployed based on the cached metadata, including identifying the set of objects based on deployment descriptors contained in the cached metadata;
verify deployability of objects in the identified set of objects to the file system of the runtime environment, wherein to verify deployability includes:

retrieve component version information for an object in the identified set of objects from the cached metadata, retrieve component version information for an already deployed object in the runtime environment, the object corresponding to the already deployed object, and determine whether the object is a different version of the previously deployed object based on the retrieved component version information for the respective objects;

encapsulate objects in the identified set of objects that are incompatible with other objects deployed to the file system of the runtime environment, including encapsulating objects that are different versions of the previously deployed objects, wherein encapsulating objects is wrapping objects to run on the runtime environment even in the presence of the other objects with which the encapsulated objects are incompatible;

deploy the identified set of objects to the file system of the runtime environment, including any encapsulated objects;

maintain in the file system of the runtime environment the other objects with which the encapsulated objects are incompatible, including maintaining previously deployed objects, until existing transactions depending upon the other objects are complete.

7. The article of manufacture of claim 6, wherein instructions causing the machine to cache metadata of the application resources from the software archive into memory, cause the machine to:

traverse the software archive;

read metadata from the deployment descriptors for the application resources accessed in the software archive; and store the metadata in the memory that is independent of the file system of the runtime environment.

8. The article of manufacture of claim 6, wherein instructions causing the machine to verify deployability, cause the machine to:

retrieve platform version information from the cached metadata;

retrieve platform version information for the runtime environment;

compare whether the retrieved platform version information from the cached metadata is compatible or incompatible with the platform version information for the runtime environment; and set a state of the set of objects to an error state if the retrieved platform version information is incompatible.

9. The article of manufacture of claim 8, wherein instructions to verify deployability cause the machine to:

identify any objects upon which the objects in the set of objects depends;

determine whether the identified objects on which the objects in the set of objects depends are available;

for each object in the set of objects that depend upon identified objects that are not available, perform one of delete the object from the set of objects, skip the object during deploying the set of objects to the file system of the runtime environment, and force the object to deploy to the file system of the runtime environment, wherein performing is based on a specified mandatory operation for the object in the set of objects if an object dependency is not satisfied; and stop deploying the set of objects if an object dependency of the object in the set of objects is not satisfied and no specified mandatory operation exists for the object.

10. The article of manufacture of claim 6, further comprising instructions causing the machine to:

log information during deploying the set of objects;

display a list of deployed objects after deployment has completed; and display a list of errors and warnings that occurred during deployment.

11. A system comprising:

a file system of a runtime environment;

memory that is independent of the file system of the runtime environment;

a software archive containing application resources having deployment descriptors, the application resources to be deployed to the file system of the runtime environment in accordance with the deployment descriptors;

an archive processor to cache metadata from the software archive to memory that is independent of the file system of the runtime environment, wherein to cache metadata from the software archive is to:

access the deployment descriptors for the application resources from the software archive in store order, extract metadata from the deployment descriptors, and store the extracted metadata in the memory;

the archive processor to further resolve deployability of objects in the software archive in accordance with the cached metadata before the objects are deployed to the file system of the runtime environment, wherein to resolve deployability of objects in accordance with the cached metadata is to:

create a set of objects to be deployed based on accessing the cached metadata for the application resources from the memory in logical order, retrieve component version information for an object in the created set of objects from the cached metadata, retrieve component version information for a previously deployed object in the runtime environment, the object in the created set of objects corresponding to the previously deployed object, determine whether the object in the created set of objects is a different version of the previously deployed object based on the retrieved component version information for the respective objects, and encapsulate objects in the created set of objects that are incompatible with other objects to be deployed to the file system of the runtime environment, including encapsulating objects that are different versions of the previously deployed objects, wherein to encapsulate objects is to wrap incompatible objects prior to deployment; and a deployment manager to deploy the created set of objects from the software archive to the file system of the runtime environment after the archive processor resolves deployability of the objects in accordance with the cached metadata, wherein to deploy the created set of objects includes to deploy encapsulated objects, and maintain the other objects with which the encapsulated objects are incompatible, including previously deployed objects, until existing transactions depending upon the previously deployed objects are complete.

12. The system of claim 11, wherein the objects in the software archive comprise a set of application components, each of the components being one of a source code module or an application configuration.

* * * * *